(12) United States Patent
Chou

(10) Patent No.: US 9,264,989 B2
(45) Date of Patent: Feb. 16, 2016

(54) INTER-RAT (RADIO ACCESS TECHNOLOGY) ENERGY SAVING MANAGEMENT

(75) Inventor: Joey Chou, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 30 days.

(21) Appl. No.: 13/991,544

(22) PCT Filed: May 7, 2012

(86) PCT No.: PCT/US2012/036798
§ 371 (c)(1),
(2), (4) Date: Sep. 27, 2013

(87) PCT Pub. No.: WO2013/022505
PCT Pub. Date: Feb. 14, 2013

(65) Prior Publication Data
US 2014/0187234 A1      Jul. 3, 2014

Related U.S. Application Data

(60) Provisional application No. 61/542,086, filed on Sep. 30, 2011, provisional application No. 61/522,623, filed on Aug. 11, 2011.

(51) Int. Cl.
*H04W 52/02* (2009.01)
*H04W 36/16* (2009.01)
*H04W 36/14* (2009.01)

(52) U.S. Cl.
CPC ........ *H04W 52/0206* (2013.01); *H04W 36/165* (2013.01); *H04W 52/0216* (2013.01); *H04W 36/14* (2013.01); *Y02B 60/50* (2013.01)

(58) Field of Classification Search
CPC .................... H04W 52/0206; H04W 52/0216; H04W 36/14; H04W 36/165

USPC ................ 455/422.1, 436, 453; 370/311, 331
See application file for complete search history.

(56) References Cited

U.S. PATENT DOCUMENTS

| 8,892,114 B2 * | 11/2014 | Mildh et al. ................. 455/453 |
| 2009/0022062 A1 | 1/2009 | Wang et al. |

(Continued)

FOREIGN PATENT DOCUMENTS

| DE | WO-2011/120554 A1 * | 6/2011 | ............ H04W 52/02 |
| FI | WO-2010/052112 A1 * | 5/2010 | ............ H04W 52/02 |

(Continued)

OTHER PUBLICATIONS

3GPP TSG-RAN WG3, R3-100376 (Jan. 2010).*

(Continued)

*Primary Examiner* — William Nealon
(74) *Attorney, Agent, or Firm* — Schwegman Lundberg & Woessner, P.A.

(57) ABSTRACT

Systems, devices, and configurations to implement ESM (energy saving management) techniques in wireless networks are generally disclosed herein. In some examples, a distributed or centralized multi-RAT (radio access technology) technique is provided to implement ESM on a LTE (Long Term Evolution) or UMTS (Universal Mobile Telecommunications System) primary cell network. The technique may factor the number of UEs unable to be offloaded to another RAT (such as a Wi-Fi network), and the service impact threshold of implementing ESM on the primary wireless network. In further examples, an ESM deployment may factor the idle mode state of UEs (user equipment) in determining whether to proceed with ESM activation at a particular time on a particular cell network.

27 Claims, 9 Drawing Sheets

(56) References Cited

U.S. PATENT DOCUMENTS

| | | | |
|---|---|---|---|
| 2009/0274121 A1 | 11/2009 | Bertorelle et al. | |
| 2010/0002614 A1* | 1/2010 | Subrahmanya | 370/311 |
| 2010/0046428 A1 | 2/2010 | Lee et al. | |
| 2011/0044284 A1* | 2/2011 | Voltolina et al. | 370/331 |
| 2011/0176511 A1 | 7/2011 | Sayeedi | |
| 2011/0211514 A1* | 9/2011 | Hamalainen et al. | 370/311 |
| 2011/0237257 A1* | 9/2011 | Soliman et al. | 455/436 |

FOREIGN PATENT DOCUMENTS

| | | | | |
|---|---|---|---|---|
| SE | WO-2010/151184 A1 * | 12/2010 | | H04W 52/02 |
| WO | WO-2013022505 A1 | 2/2013 | | |

OTHER PUBLICATIONS

3GPP TS 32.551 V10.1.0 (Mar. 2011).*

3GPP RAN3 #66bis, R3-100181, (Jan. 2010).*

"International Application Serial No. PCT/US2012/036798, Search Report mailed Aug. 29, 2012", 5 pgs.

"International Application Serial No. PCT/US2012/036798, Written Opinion mailed Aug. 29, 2012", 4 pgs.

"Study on Energy Savings Management (ESM)", 3GPP TR 32.826, V10.0.0, (Release 10), (Mar. 2010), 33 pgs.

"Study on Operations, Administration and Maintenance (OAM) aspects of inter-Radio-Access-Technology (RAT) energy saving", 3GPP TR 32.834, V11.0.0, (Release 11), (Jan. 2012), 29 pgs.

"3rd Generation Partnership Project; Technical Specification Group Services and System Aspects; Telecommunication management; Study on Energy Savings Management (ESM) (Release 10)", 3GPP Standard; 3GPP TR 32.826 No. V10.0.0, (Mar. 30, 2010), 1-33.

"Constrains and opportunities for energy saving with compensation functionality", Nokia Siemens Networks 3GPP Draft; R3-102349 ES_Compensation vol. RAN WG3, (Aug. 15, 2010), 2 pgs.

"European Application Serial No. 12821656.1, Extended European Search Report mailed May 4, 2015", 5 pgs.

"International Application Serial No. PCT/US2012/036798, International Preliminary Report on Patentability mailed Feb. 20, 2014", 6 pgs.

"Network Sharing in Inter-RAT energy saving", Teliasonera 3GPP Draft; R3-110847JNTER-RAT, 3rd Generation Partnership Project (3GPP), Mobile Competence Centre vol. RAN WG3, (Feb. 14, 2011), 3 pgs.

"On the benefit of cell coordination for energy saving", Mitsubishi Electric 3GPP Draft; R3-103531—(Coordinationes) vol. RAN WG3, (Nov. 8, 2010).

* cited by examiner

INTER-RAT (RADIO ACCESS TECHNOLOGY) ENERGY SAVING MANAGEMENT

PRIORITY CLAIM

This application is a U.S. National Stage Filing under 35 U.S.C. 371 from International Patent Application Serial No. PCT/US2012/036798, filed May 7, 2012, published on Feb. 14, 2013 as WO 2013/022505 A1, which claims the benefit of priority of two U.S. Provisional Patent Application Ser. No. 61/522,623, filed Aug. 11, 2011, and Ser. No. 61/542,086, filed Sep. 30, 2011, which are herein incorporated by reference in their entireties.

TECHNICAL FIELD

Embodiments pertain to wireless networks and wireless network communications facilitated by various devices and systems. Some embodiments relate to energy saving techniques and controls implemented within wireless networks and associated devices and systems.

BACKGROUND

Existing wireless networks provide varying levels and implementations of energy saving management (ESM) techniques. ESM may be provided in cellular wide area wireless networks (WWANs) to power down cell base stations. One example ESM implementation, introduced in the 3GPP Long Term Evolution Advanced (LTE-A) Release 10 specification, provides an intra-radio access technology (RAT) scenario where all enhanced NodeB base stations (eNodeBs) utilize the same Radio Access Technology (RAT) and provide the same services.

Proposed inter-RAT ESM approaches typically rely on moving a subscriber from a high-speed RAT to a lower-speed RAT when attempting to implement ESM on a high-speed RAT. Subscribers, however, are unlikely to want to be downgraded to a less-robust data connection at non-peak times simply to save energy for network operators. Thus, there is a need to provide a level of service that is acceptable to subscribers while implementing ESM and saving energy where possible.

Further, some ESM approaches use traffic load statistics, or threshold crossing, to determine when ESM should be implemented and which cells should be switched off or on. Traffic load statistics do not adequately factor the different service capabilities and Quality of Service (QoS) associated with different RAT.

DESCRIPTION OF THE EMBODIMENTS

Figure 1:
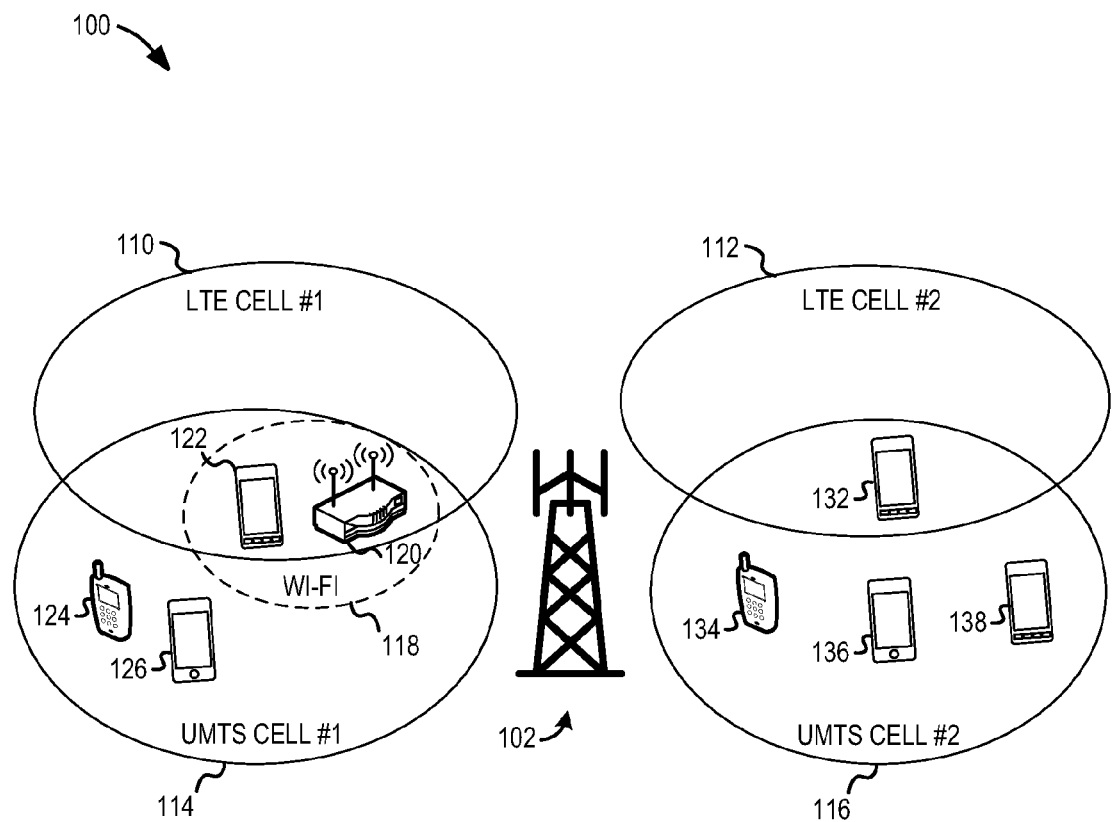
FIG. 1 illustrates an example multi-RAT (radio access technology) wireless network architecture operable in connection with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein may provide energy saving management (ESM) in wireless network architectures implementing multiple radio access technologies (RATs) and facilitating Inter-RAT communications (e.g., a communication being transferred or facilitated among multiple RATs). For example, in some embodiments, Inter-RAT ESM techniques are provided to factor the service impact of decreased resources during initiation or maintenance of ESM. In some further embodiments, the initiation or maintenance of such Inter-RAT ESM techniques are provided to support UE (user equipment) operating in an idle mode.

One consideration for implementing Inter-RAT ESM is to determine the level of impact of decreased services during ESM that can be acceptable to subscribers. Limited inter-RAT approaches have been proposed that transfer subscribers between different RAT, specifically to lower-speed RAT (e.g., GSM (Global System for Mobile Communications), UMTS (Universal Mobile Telecommunications System) to implement ESM. These approaches, however, are not able to address the service impact issue on some subscribers from Inter-RAT ESM.

For example, a LTE network may provide hot spot coverage to increase network capacity in an attempt to mitigate traffic congestion during peak hours. During non-peak hours, the LTE data network may switch users from an enhanced Universal Terrestrial Radio Access Network (eUTRAN) to a GSM EDGE Radio Access Network (GERAN) or a UMTS Terrestrial Radio Access Network (UTRAN) to implement ESM and power down LTE cells. While most subscribers in off-peak hours may not be using data-intensive applications, the remaining subscribers are likely to be unhappy with the speed, quality, and level of service from a GERAN or UTRAN network The presently described methods and system configurations for Inter-RAT communications are provided to address such service impacts, while meeting the energy service requirements and objectives. In one embodiment, the presently described techniques use multiple RAT coordination to provide an adequate level of services to subscribers during the energy saving interval, rather than using a single RAT or lower-speed RAT that may cause a huge impact to user services and UE performance. In some embodiments, the Inter-RAT ESM techniques coordinate data and voice services among multiple RATs to maintain an adequate level of service for users during the energy saving interval.

In further embodiments, techniques are provided to ensure service levels for UEs operating in an idle mode. For example, one technique disclosed herein factors the behavior of UE in an idle mode into the ESM decision making process, to more accurately determine an ESM interval and when to activate ESM. Idle mode UE behavior is not adequately considered or factored with existing Inter-RAT ESM techniques. Factoring idle mode UE behavior may help ensure that UE services are not impacted because the ESM is prematurely or incorrectly implemented.

Wi-Fi offloading may provide one cost effective solution to mitigate the network congestion and quality issue for ESM purposes. In some embodiments, Wi-Fi is implemented as the secondary service RAT to provide back-up coverage during the energy saving interval when primary service RAT (e.g., LTE cells) are switched off from ESM.

For example, LTE networks may be deployed with hotspot coverage to meet the demand of high speed data services. Fourth-generation devices such as smartphones and tablets are often enabled to access LTE services. Typically these fourth-generation devices are also equipped with Wi-Fi networking (e.g., devices that are compliant with a network standard selected from the IEEE 802.11 standards family). In many cellular networks, LTE provides data-only service. Many cellular network operators use 2G/3G legacy systems such as UMTS or CDMA to provide voice services, because the deployment of voice over LTE (VoLTE) is not currently widespread.

In many settings, Wi-Fi networks may be accessible by fourth-generation devices to provide high speed data service at LTE or near-LTE speeds. Use of Wi-Fi by fourth-generation devices in many cases may address network operator concerns that legacy GSM/UMTS RATs are unable able to provide the services that LTE subscribers paid for. For example, during the off-peak hours (late evenings, nights, or early mornings), LTE devices are likely to be located at homes that are within the coverage of a Wi-Fi network. As described herein, ESM techniques for the LTE network may be implemented using Wi-Fi offloading functions. These Wi-Fi offloading functions may be used in connection with offloading techniques as defined in 3GPP or other wireless network specifications.

FIG. 1 provides an illustration of an example configuration 100 of wireless networks provided in connection with some embodiments. The example configuration 100 illustrates that in certain scenarios, secondary networks such as a UMTS network provided by a UMTS Cell #1 114 and a Wi-Fi network 118 may offer coverage and services to UEs such as a UE 122 using Inter-RAT ESM techniques. The use of such Inter-RAT ESM techniques enables a primary data network such as a LTE network provided by a LTE Cell #1 110 to be powered down to implement ESM, while relying on a secondary data network, such as a Wi-Fi network 118, to provide a sufficient level of data service.

As illustrated in FIG. 1, one or more access points such as a Wi-Fi access point 120 may be configured to establish and provide the Wi-Fi network 118 that is capable of providing connections to the internet or another wide area network for UEs such as the UE 122. The Wi-Fi network 118 provided from the Wi-Fi access point 120 may be used to offer data services to the UE 122. The voice network provided from the UMTS Cell #1 114 may be used to offer voice services to the UE 122. Therefore, when ESM is implemented to deactivate the LTE Cell #1 110, a continuous data service offering may still be provided to the UE 122.

FIG. 1 also illustrates scenarios where ESM may not be implemented or will have no effect on the UE if implemented. For example, the UE 132 may receive data services from the LTE Cell #2 112, and voice services from the UMTS Cell #2 116. The UE 132 does not have access to a secondary network such as a Wi-Fi network, so its data connection cannot be offloaded. Therefore, the LTE Cell #2 112 cannot enter ESM without causing a loss of high-speed data services to the UE 132.

Further, the operation of ESM with the primary data network (the LTE Cell #1 110 and the LTE Cell #2 112) does not affect UEs which are not primary-network capable (e.g., 3G or older-technology capable devices), or are out of range of the primary network cell (e.g., out of range of the LTE Cell #1 110 or the LTE Cell #2 112) or the secondary RAT network (e.g., out of range of the Wi-Fi network 118). These devices include the UEs 124 and 126 (shown as being out of range or not-capable of communicating with the LTE Cell #1 110) which may obtain data services from the UMTS Cell #1 114; and the UEs 134, 136, 138 (shown as being out of range or not-capable of communicating with the LTE Cell #2 112) which may obtain data services from the UMTS Cell #2 116.

In some settings, one or more LTE cells may be deployed to provide hot-spot data-only coverage to increase the network capacity as an attempt to mitigate data traffic congestion during peak hours. In the Inter-RAT ESM scenario, different RATs may provide different services and may need to be factored in the ESM implementation. For example, GSM/UMTS networks may be used to provide circuit-switched (CS) voice service and low to medium speed data services, while LTE may be used to provide high speed data services. Therefore, dual-mode UE providing access to GSM/UMTS and LTE may be used to provide the basic voice and data services for network subscribers. In other settings, ESM may be implemented on UMTS networks for UMTS networks that provide both data and voice services.

The following terms are used to distinguish between different types of cells involved in an ESM implementation. An Energy Saving Cell is used to refer to cells that are or are intended to be placed in energy saving mode. An Energy Saving Backup Cell refers to cells that provide services to UE that were or are intended to be detached from Energy Saving Cells.

For example, in one embodiment, GSM/UMTS/CDMA networks serve as Energy Saving Backup cells to provide basic coverage that includes emergency services (e.g. E911), and should not be Energy Saving Cells. Hence, in one Inter-RAT ESM scenario, cells operating according to LTE or another 4G protocol would serve as the Energy Saving Cells. In another scenario, cells operating according to UMTS (e.g., HSPA+) or another 3G/3.5G protocol would serve as the Energy Saving Cells.

Given the concerns that customers subscribed to 4G or other high-speed services will become dissatisfied when their service has been downgraded to GERAN or UTRAN, or other older network technology, it is important to minimize the service impact during the energy saving interval. This may be accomplished through the use of a secondary network such as a Wi-Fi network providing a backup data service.

The following table shows that multiple RAT and the associated services are used to carry the traffic for LTE and UMTS in the energy saving mode. Each UMTS UE is also dual mode that has both accesses to both UMTS and GSM radio access networks.

TABLE 1

| Energy Saving Cell | Energy Saving Backup Cell | Services |
|---|---|---|
| LTE/LTE-A | GSM/UMTS/EVDO/CDMA2000 | Voice |
|  | Wi-Fi | Data |
| UMTS (e.g., HSPA+) | GSM | Voice |
|  | Wi-Fi | Data |

Deploying ESM with multiple RAT may be performed with either centralized multiple RAT ESM or distributed multiple RAT ESM techniques. These techniques are addressed in the following sections.

1. Centralized Multiple RAT ESM

The following provides an overview of implementing centralized ESM for LTE and UMTS RAT according to one example embodiment. This ESM procedure includes: (1) Energy saving initiation: The procedure to prepare a cell or network element (NE, e.g., a NodeB or an eNodeB) prior to energy saving activation; and (2) Energy saving activation: The procedure to switch off a cell or NE or restrict the usage of physical resources for energy saving purposes. As a result of these two operations, a specific network element may be transitioned into an energy saving state.

1.1 LTE RAT

In this example scenario, an LTE-capable UE is dual mode that is capable of connection to both LTE and UMTS/GSM cells. The ESM is only implemented on data services of the LTE cell, and ESM provides no impact to UE's access to voice services offered by UMTS/GSM.

Figure 2A:
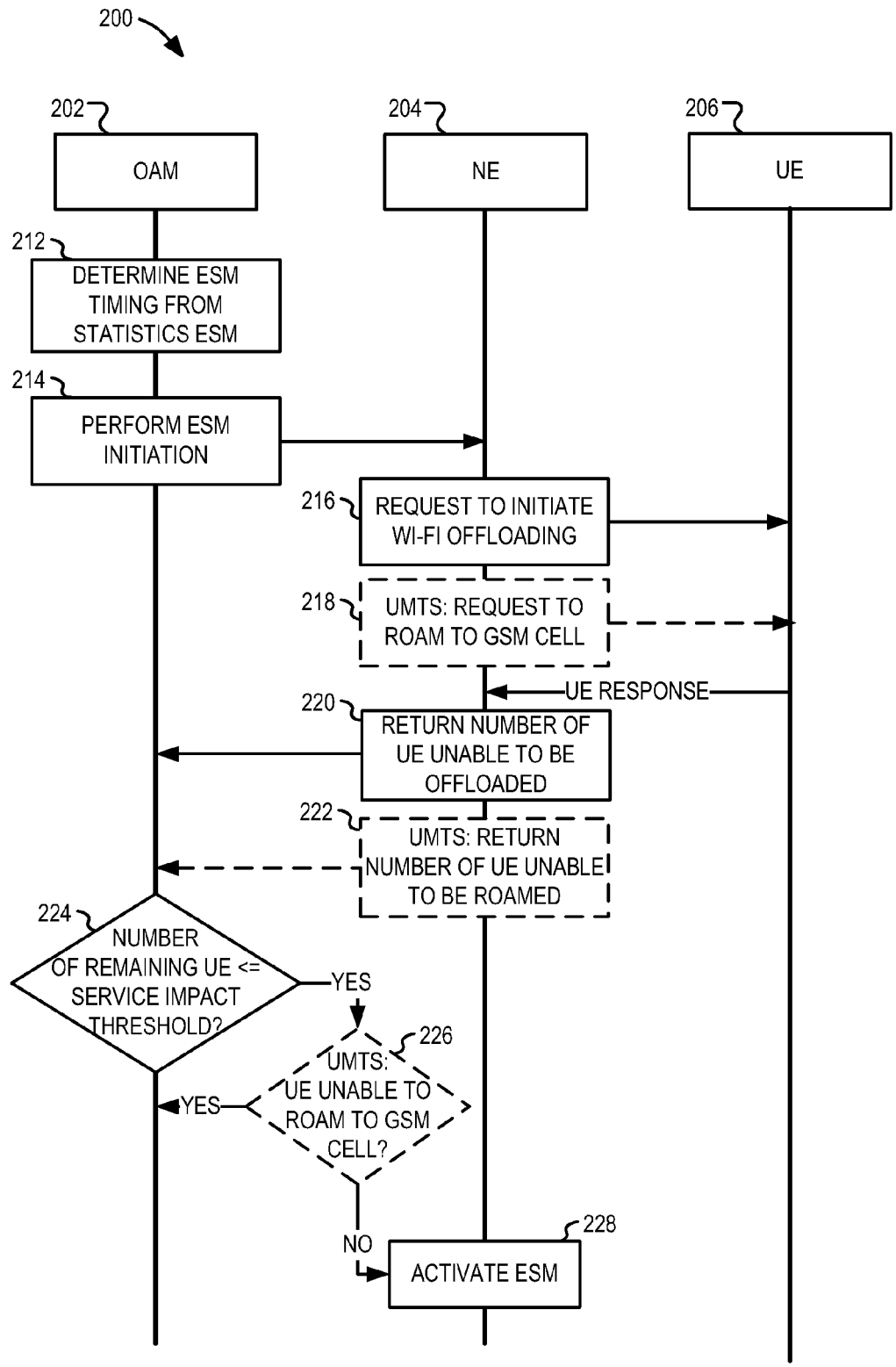
FIG. 2A illustrates example operations performed for centralized multi-RAT (radio access technology) energy saving management according to some embodiments.

FIG. 2A provides an illustration of energy saving activation in a centralized Multiple RAT ESM scenario. As depicted, at least one Operations Administration and Management (OAM) unit 202 performs the energy saving initiation (operation 214) on at least one NE (e.g., NE 204). The ESM initiation may be performed at the time determined by ESM statistics (operation 212).

The NE 204 requests the attached at least one UE 206 to initiate Wi-Fi offloading (operation 216). The NE 204 returns to OAM 202 the number of UE that cannot be offloaded to a secondary RAT (e.g., Wi-Fi) (operation 220).

The OAM 202 is configured to perform the energy saving activation on the NE 204 (operation 228) if the number of remaining UE 206 is not greater than the service impact threshold (decision 224). The service impact threshold may be a variable, fixed, predetermined, or run-time determined value. OAM performs an energy saving deactivation procedure (not shown) at a predetermined time, at the time determined by statistics-based ESM, or in response to an indication from the energy saving NE indicating a surge of data traffic.

1.2 UMTS RAT

In this example scenario, a UMTS UE is dual mode that is capable of connection to both UMTS data cells (e.g., HSPA+ cell) and GSM cells. The following is the concept of energy saving activation for a UMTS network, illustrated with further operations in FIG. 2A.

As depicted in FIG. 2A, the OAM 202 performs the energy saving initiation on an NE 204 (operation 214) at the time determined by statistics-based ESM (operation 212). The NE 204 requests the attached UE 206 to initiate Wi-Fi offloading if such a UE 206 has subscribed to the data services (operation 216) and will roam to the GSM cell for voice operations (operation 218).

The NE 204 returns the number of UEs 206 that cannot be offloaded to a secondary network (e.g., a Wi-Fi network) (operation 220), and the number of UE 206 that cannot be roamed to a GSM cell for voice operations (operation 222).

The OAM 202 should perform the energy saving activation of the NE 204 (operation 228) if the number of remaining UEs 206 is not greater than the service impact threshold (decision 224) and there is no UE 206 that cannot roam to the GSM cell (decision 226).

Again the OAM 202 is configured to perform the energy saving deactivation for the UMTS NE 204 at a predetermined time, at the time determined by statistics-based ESM, or in response to an indication from the energy saving NE 204 indicating a surge of data traffic.

Distributed Multi-RAT ESM

Figure 2B:
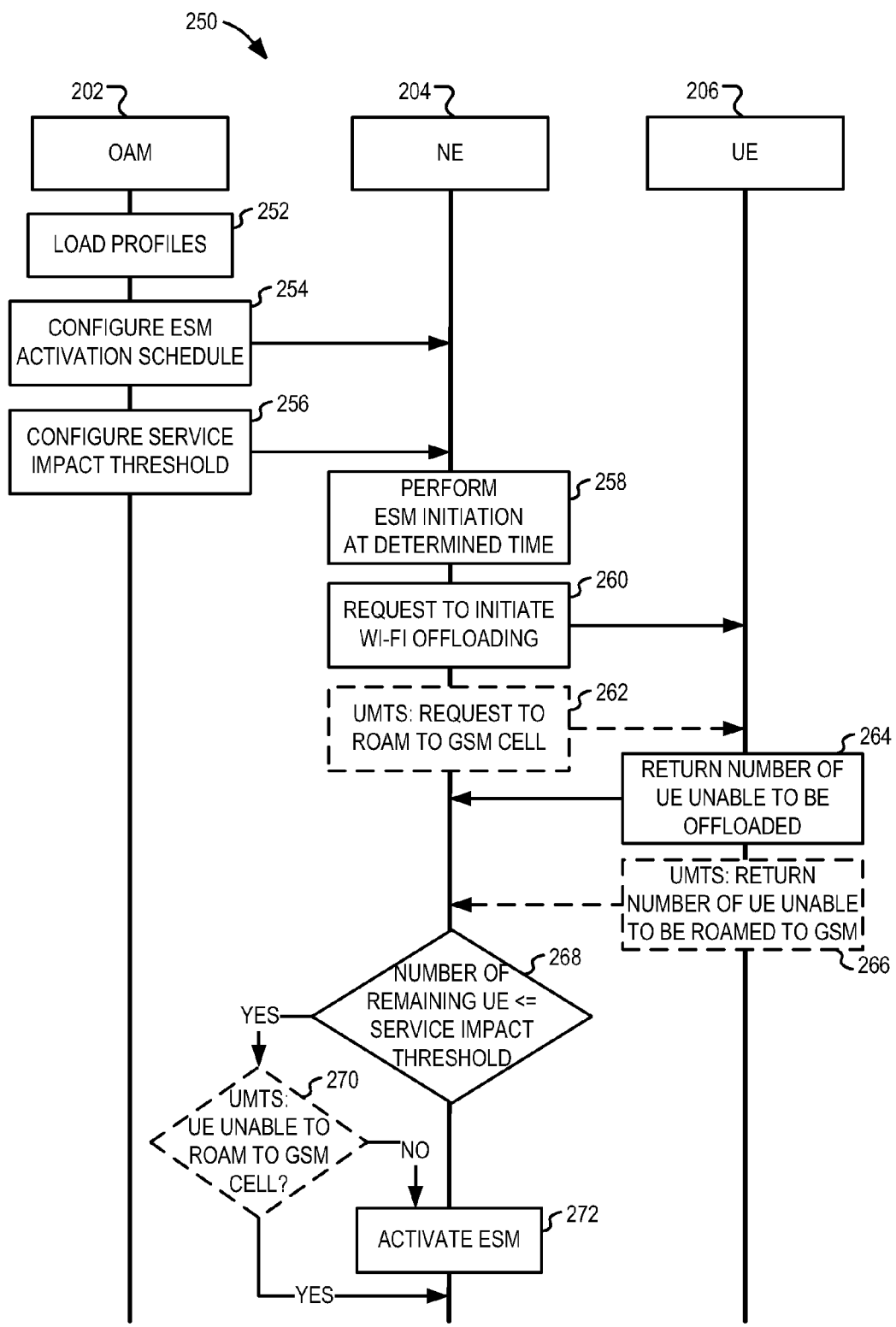
FIG. 2B illustrates example operations performed for distributed multi-RAT (radio access technology) energy saving management according to some embodiments.

The following concepts describe distributed ESM for LTE and UMTS RATs. FIG. 2B provides an illustration of energy saving activation in a distributed Multiple RAT ESM scenario. As depicted, in a similar fashion to FIG. 2A, at least one Operations Administration and Management (OAM) unit 202 performs ESM in connection with at least one NE 204 and at least one UE 206.

As illustrated in FIG. 2B, the OAM 202 loads the profiles (operation 252) that includes:

Configuration of ESM activation schedule (operation 254). The energy saving activation and deactivation schedules that were derived from the statistics of traffic loads. For example, energy saving is activated when the traffic load is below a certain threshold, and deactivated when above certain traffic load threshold.

Configuration of service impact threshold (operation 256). The service impact threshold is the maximum number of UE attached to a NE that correlates to the acceptable service impact if a UE decided to use the data service during the energy saving interval. When the number of UE is greater than service impact threshold, it means that the chance of a detrimental service impact is higher.

Further operations for the distributed multiple RAT ESM scenario is described with reference to FIG. 2B for an LTE RAT and a UMTS RAT.

Distributed Multiple RAT ESM: LTE RAT

An LTE UE is typically a dual mode device that may connect to both LTE and UMTS/GSM cells. In this scenario, the ESM is only implemented for the LTE cell (providing data services), and has no impact to the UE's access to UMTS/GSM (providing voice services).

As further depicted in FIG. 2B, the OAM 202 configures the schedule of ESM activation and deactivation (operation 254), and configures the service impact threshold at the LTE NE 204 (operation 256). At the scheduled or otherwise determined energy activation time (operation 258), the NE 204 requests the attached UEs 206 to perform ESM initiation (operation 260), resulting in the initiation of Wi-Fi offloading at the UEs 206.

The NE 204 may be configured to perform the energy saving activation (operation 272) if the number of UEs 206 that cannot offload to the secondary network (e.g., the Wi-Fi network) is not greater than the service impact threshold (decision 268). The NE 204 should perform the energy saving deactivation (not shown) at the scheduled energy saving deactivation time, or as requested by OAM 202.

Distributed Multiple RAT ESM: UMTS RAT

An UMTS UE is typically a dual mode device that may connect to UMTS cells (for voice and data) and GSM cells (for voice). The following is the concept of energy saving activation when the NE 204 is a UMTS NE.

As depicted in FIG. 2B, the OAM 202 configures the schedule of ESM activation and deactivation (operation 254), and configures the service impact threshold at the UMTS NE 204 (operation 256). At the scheduled or otherwise determined energy activation time (operation 258), the NE 204 requests the attached UE 206 to perform ESM initiation (operation 260).

The ESM initiation results in the initiation of offloading UE data connections to the secondary network, such as using Wi-Fi offloading (operation 260), if such UEs 206 subscribe to the data services. The NE 204 will further issue a command to the UE 206 to roam to the GSM cell (operation 262). This will result in an indication of the number of UEs 206 unable to be offloaded (operation 264) and the number of UEs 206 unable to be roamed to the GSM cell (operation 266).

The NE 204 may be configured to perform the energy saving activation (operation 272) if there are no UEs 206 that are unable to roam to the GSM cell (decision 270), and the number of remaining UEs 206 unable to be offloaded are not greater than the service impact threshold (decision 268). The NE 204 may perform the energy saving deactivation (not shown) at the scheduled energy saving deactivation time, or as requested by OAM 202.

ESM with Idle Mode UE

Typical ESM algorithms use threshold crossing or traffic load statistics to determine whether the hot spot cells should be switched off for ESM purposes. Using traffic load statistics does not effectively work in all Inter-RAT ESM settings, because it does not factor the different service capabilities and QoS levels associated with different RATs. The following describes various techniques for deploying Inter-RAT energy saving management supporting idle mode UEs.

Some existing ESM techniques attempt to factor UEs in idle mode by including additional measurements before performing ESM. For example, some techniques include monitoring and factoring the number of UE currently attached to a cell in the ESM decision making process.

This measurement focuses on the number of UE that are actively connected to the eNodeB. The number of idle mode UE in a cell may not always be available, since the eNodeB is not able to know the exact UE location until a location update that is determined by the location update timer (typically in the range of minutes). However, the number of connected mode UE is always available. When the number of connected mode UE is higher than a determined threshold, the UE may generate significant traffic after being handed over to UMTS/GSM cells. If the number of connected mode UE is equal to or lower than a determined threshold, the ESM service impact is acceptable, and the energy saving can be activated.

The idle mode UE has a specific behavior that can be detected and used to enhance ESM decision making. The detection and response to typical idle mode UE behavior is based on the following assumptions: during the off-peak hours, most UE are in an idle mode; and during the off-peak hours, most UE are stationary (such as being used by a user at home), and should be associated with the same eNodeB as the one used to previously enter the idle mode. Detection of the idle mode may require that ISR (Idle state Signaling Reduction) be supported. Further techniques to factor UE idle mode states are discussed in the following sections.

A further assumption that may apply to most use cases is that the UEs in idle mode are connected to both E-UTRAN and GERAN/UTRAN networks, and should be in the EMM_REGISTERED state. This enables the UEs to be paged for downlink messages from the E-UTRAN (LTE) and GERAN/UTRAN (GSM/UMTS) networks.

Figure 3:
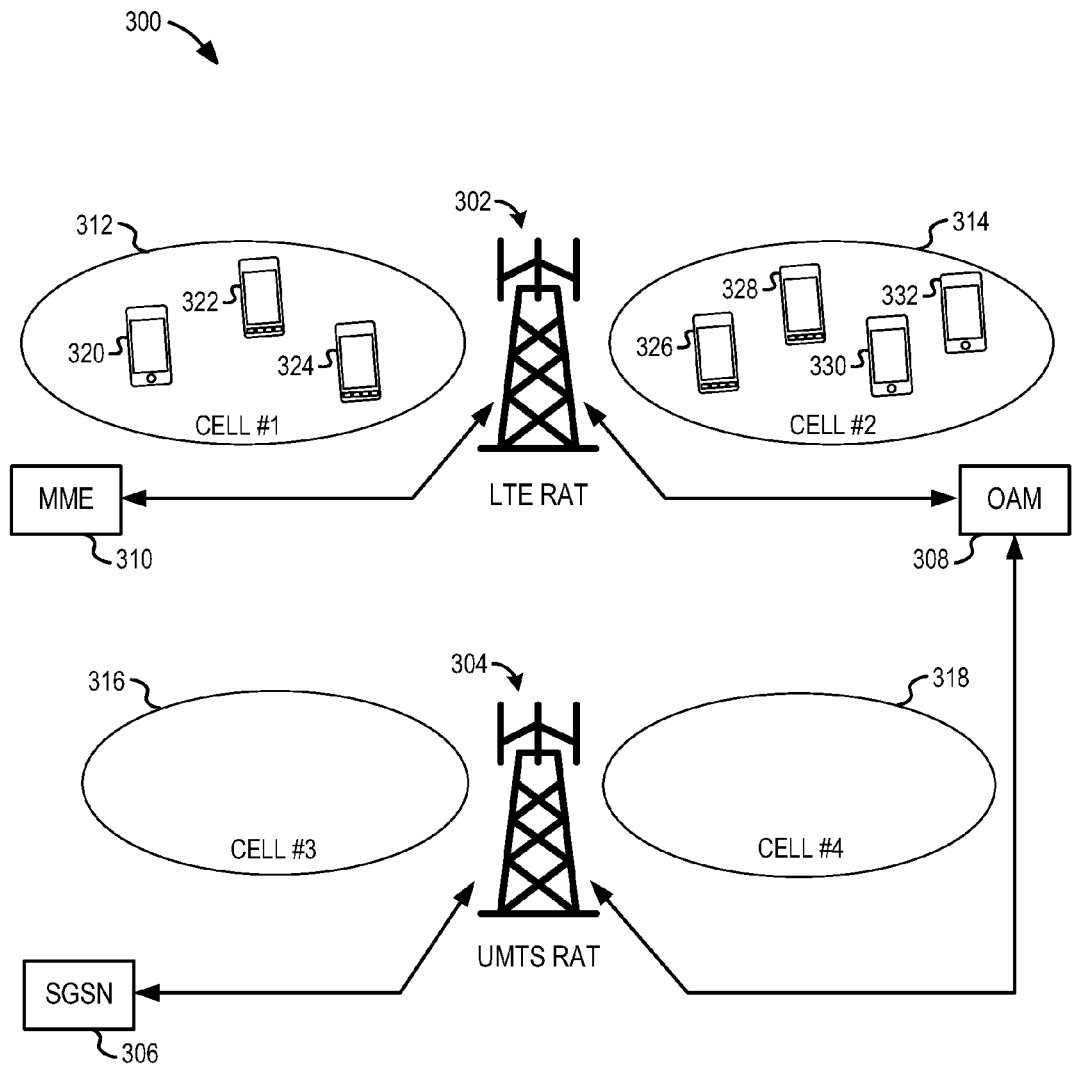
FIG. 3 illustrates an example inter-RAT (radio access technology) energy saving management architecture operable in connection with some embodiments.

FIG. 3 provides an illustration of an Inter-RAT ESM Architecture 300 factoring UEs in idle mode. As illustrated, a Cell #1 312 and a Cell #2 314 are LTE cells provided from a LTE RAT 302, while a Cell #3 316 and a Cell #4 318 are UMTS cells provided from a UMTS RAT 304. The Cell #1 312, the Cell #2 314, the Cell #3 316, and the Cell #4 318 are connected to an OAM 308 that can download ESM profiles, such as a traffic threshold for ESM activation/deactivation. The LTE Cell #1 312 and the Cell #2 314 are connected to a Mobility Management Entity (MME) 310 for supporting idle mode registration. The UMTS Cell #3 316 and Cell #4 318 are connected to a Serving GPRS Support Node (SGSN) 306 for supporting idle mode registration.

In a multi-RAT scenario, the UEs 320, 322, and 324 have access to both LTE Cell #1 312 and UMTS Cell #3 316, while UEs 326, 328, 330, and 332 have access to both LTE Cell #2 314 and UMTS Cell #4 318. Each UE may have ISR activated or deactivated.

To illustrate an example, when the UEs 320 and 322 are ISR activated, it means both UEs are registered with both the MME 310 and the SGSN 306 in LTE Cell #1 312 (E-UTRAN) and UMTS Cell #3 316 (UTRAN), respectively. When the LTE Cell #1 312 is switched off due to ESM, the UEs 320 and 322 are still in EMM_REGISTERED state, and are registered at the UMTS Cell #3 316 (UTRAN).

When the UE 324 is ISR deactivated, it means the UE 324 is registered with the MME 310 in the E-UTRAN. When the LTE Cell #1 312 is switched off, the UE 324 is in the EMM_DETACHED state, and cannot send or receive any data. In such a setting, ESM cannot be activated on LTE Cell #1 312—otherwise the UE 324 will not be able to receive services.

Since the UEs are connected to the same eNodeB as the last time the UEs entered the idle mode during off-peak hours, the MME 310 should be able to determine which eNodeB the UE is likely to reside on. Therefore, the eNodeB of a network provided by the LTE RAT 302 can use the ISR activation/deactivation state of the UEs that are connected with the eNodeB as an indicator to determine if a UE may be connected with the GERAN/UTRAN cells that can provide services during the ESM interval.

Distributed Idle Mode UE ESM

Figure 4A:
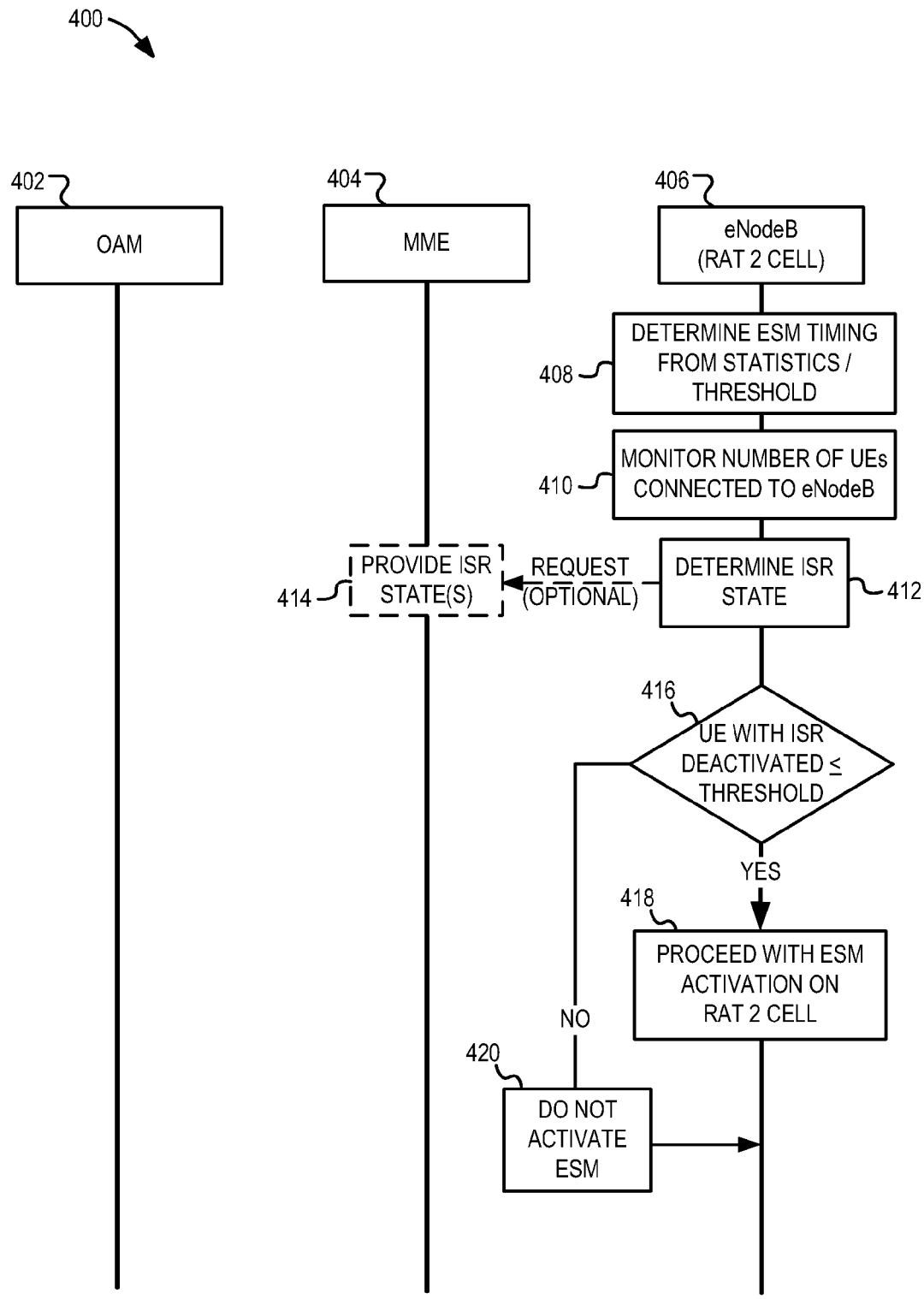
FIG. 4A illustrates example operations performed for a decentralized inter-RAT (radio access technology) idle mode energy saving management according to some embodiments.

In some embodiments, idle mode ESM activation may be provided in a distributed fashion. FIG. 4A provides an illustration of a decentralized idle mode ESM activation operation 400, provided by decentralized activities occurring at an eNodeB 406 (e.g., providing a RAT 2 Cell) according to an example embodiment. As illustrated, an OAM 402 and a MME 404 provide no or minimal involvement in the decentralized ESM activation.

The LTE cell eNodeB 406 may initiate the energy saving measures at the time determined by the statistical load measurements or by crossing the relevant threshold (operation 408). Next, the LTE cell eNodeB 406 monitors the number of UEs that are connected to it (operation 410), and determine the ISR activation/deactivation state of the particular UEs (operation 412). The LTE cell may need to communicate with the MME 404 to obtain the ISR activation/deactivation state information (operation 414) if such information is not available in the LTE cell eNodeB 406. If the number of UEs camped on the LTE cell eNodeB 406 with ISR deactivated is equal to or less than a threshold (decision 416), then the LTE cell can proceed with ESM activation (operation 418). Otherwise, the LTE cell will not enter the ESM state (operation 420).

For energy saving deactivation, the secondary service (such as the UMTS cell) terminates the energy saving measures at the time determined by the statistical load measurements or by crossing the relevant threshold. For example, the UMTS cell may ask the LTE cell that is backed up by the UMTS cell to terminate the energy saving measures. After being notified by the LTE cell that the energy saving measures have been terminated, the UMTS cell incrementally asks the UE to perform tracking area updates (TAU) to connect to the LTE cell.

Centralized Idle Mode UE ESM

Figure 4B:
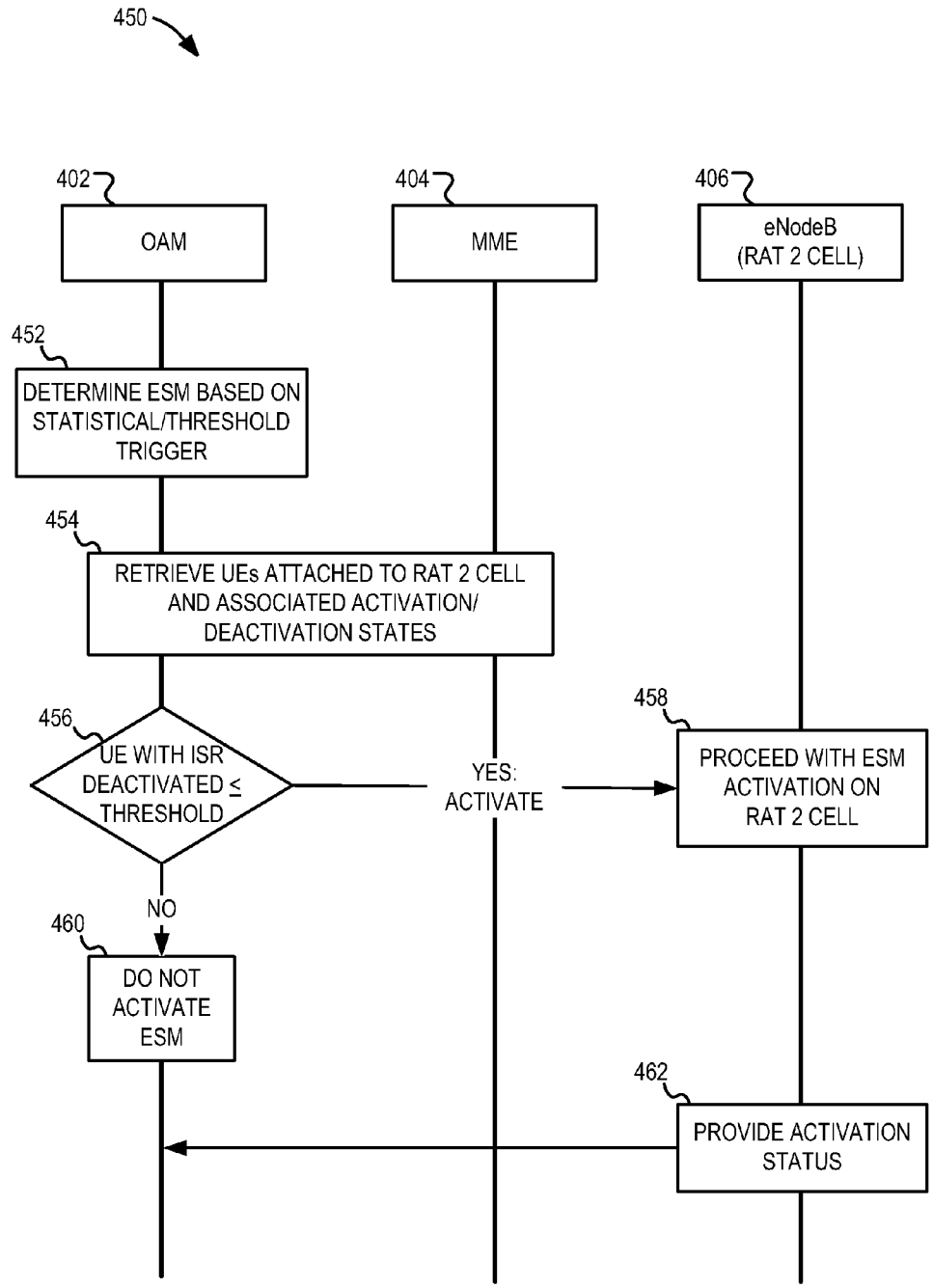
FIG. 4B illustrates example operations performed for a centralized inter-RAT (radio access technology) idle mode energy saving management according to some embodiments.

In some embodiments, idle mode ESM activation may be provided in a centralized fashion. FIG. 4B provides an illustration of a centralized idle mode ESM activation operation 450, provided by a centralized idle mode ESM control flow according to an example embodiment.

As illustrated, the OAM 402 activates energy saving measures for the LTE cell at the time determined by the statistical load measurements or by crossing the relevant threshold (operation 452). The OAM 402 retrieves the number of UEs that are connected to it, and the UE ISR activation/deactivation state from the MME 404 (operation 454). A determination is made whether there are any UEs with ISR deactivated (decision 456). If the number of UEs with ISR deactivated is equal to or less than a determined threshold, then the OAM 402 asks the eNodeB 406 to activate ESM operations (operation 458). The results of the ESM activation are then reported from the eNodeB back to the OAM (operation 462). If there more than a threshold number of UEs with ISR deactivated, then the LTE cell should not enter the ESM state (operation 460), since some UE services will be impacted.

Overview of Multi-RAT ESM Operations

Figure 5:
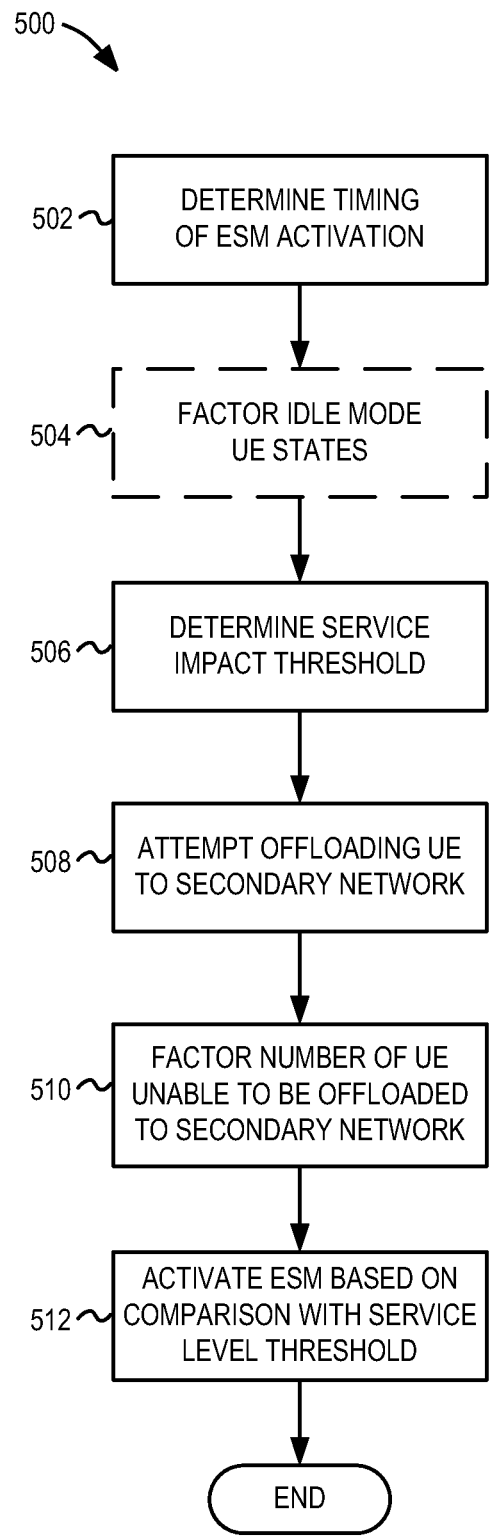
FIG. 5 illustrates an example method for implementing energy saving management in a multi-RAT (radio access technology) wireless network architecture according to some embodiments.

FIG. 5 illustrates an example method 500 for establishing ESM in a wireless network using inter-RAT offloading (e.g., offloading to another RAT wireless network such a Wi-Fi secondary network). The following method and flow is provided for illustration purposes, as it will be apparent that the sequence of operations of method 500 may be reordered, with particular operations added or removed (such as operation 504 which may be optionally performed).

As illustrated, method 500 used to establish ESM in a wireless network may include determining timing of ESM activation (operation 502). This may be performed in connection with one or more determinations related to predetermined times and schedules, or dynamic conditions such as traffic load statistics, or service thresholds, and other service-related conditions. The timing, activation, and use of ESM in a wireless network may also factor the idle mode state of UEs connected to the wireless network (operation 504).

Next, the activation of the ESM, may determine a service impact threshold (operation 506) for operations of the wireless network. The value (or values) for this service impact threshold may be calculated in real time, calculated at a previous time, retrieved from a stored value data source, or determined or derived from any number of locations. As one example, the service impact threshold may be a maximum number of users on a particular cell or group of cells that may handle a service impact, such as 5 users maximum on a cell network having a maximum capacity of 100 total users.

Upon activation of ESM, then the wireless network (and components within the wireless network) may attempt offloading UEs to a secondary network (operation 508). The results of the offloading UEs to the secondary network, such as the number of UEs unable to be successfully offloaded, may then be factored (operation 510). For example, factoring the number of UEs unable to be offloaded may include performance of a comparison to a service impact threshold, or a real-time calculation. ESM and associated ESM operations may then be activated based on the comparison with the service level threshold (operation 512). For example, if 5 or more UEs were unable to be offloaded to the secondary network, and the service level threshold is 5 users, then ESM will not be activated. Likewise, if fewer than 5 UEs were unable to be offloaded to the secondary network, and the service level threshold is 5 users, then ESM may be activated, despite the potential loss or downgrade of service to the fewer than 5 UEs.

Although several of the described embodiments were included with reference to the use of LTE, UMTS, GSM, Wi-Fi, and IEEE 802.11 standard wireless network implementations, it will be understood that the present techniques may be implemented in connection with a variety of other wireless network standards, such as WiMAX, CDMA2000, EV-DO, and other 2G, 3G, 4G, and 5G-standard Wireless Wide Area Network (WWAN) protocols and devices. Therefore, the term "wireless network" as used herein is not necessarily intended to be limiting to the use of any particular WWAN or WLAN network protocol, but may also include a variety of wireless protocols and devices communicating via such wireless protocols.

As described herein, various methods or techniques, or certain aspects or portions thereof, may take the form of program code (i.e., instructions) embodied in tangible media, such as flash memory, CD/DVD-ROMs, hard drives, portable storage devices, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 6:
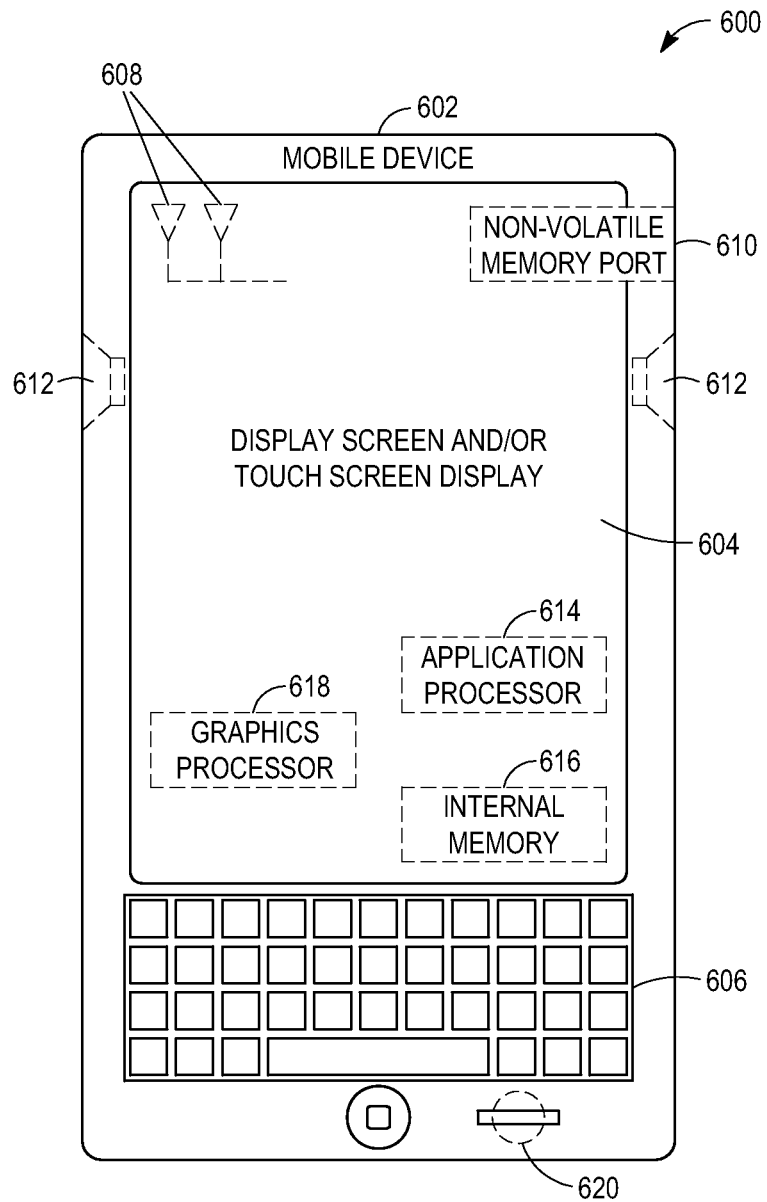
FIG. 6 illustrates an example mobile device that may be used in connection with the configurations and techniques described herein.

FIG. 6 provides an example illustration of a mobile device 600, such as a user equipment (UE), a mobile station (MS), a mobile wireless device, a mobile communication device, a tablet, a handset, or other type of mobile wireless device. The mobile device may include one or more antennas 608 configured to communicate with a base station (BS), an evolved Node B (eNB), other type of wireless wide area network (WWAN) access point, or other network equipment (NE). The mobile device may be configured to communicate using at least one wireless communication standard including 3GPP LTE, WiMAX, High Speed Packet Access (HSPA), Bluetooth, and Wi-Fi. The mobile device 600 may communicate using separate antennas for each wireless communication standard or shared antennas for multiple wireless communication standards. The mobile device may communicate in a wireless local area network (WLAN), a wireless personal area network (WPAN), and/or a wireless wide area network (WWAN).

FIG. 6 also provides an illustration of a microphone 620 and one or more speakers 612 that may be used for audio input and output from the mobile device 600. The display screen 604 may be a liquid crystal display (LCD) screen, or other type of display screen such as an organic light emitting diode (OLED) display. The display screen 604 may be configured as a touch screen. The touch screen may use capacitive, resistive, or another type of touch screen technology. An application processor 614 and a graphics processor 618 may be coupled to internal memory 616 to provide processing and display capabilities. A non-volatile memory port 610 may also be used to provide data input/output options to a user. The non-volatile memory port 610 may also be used to expand the memory capabilities of the mobile device 600. A keyboard 606 may be integrated with the mobile device 600 or wirelessly connected to the mobile device 600 to provide additional user input. A virtual keyboard may also be provided using the touch screen.

Figure 7:
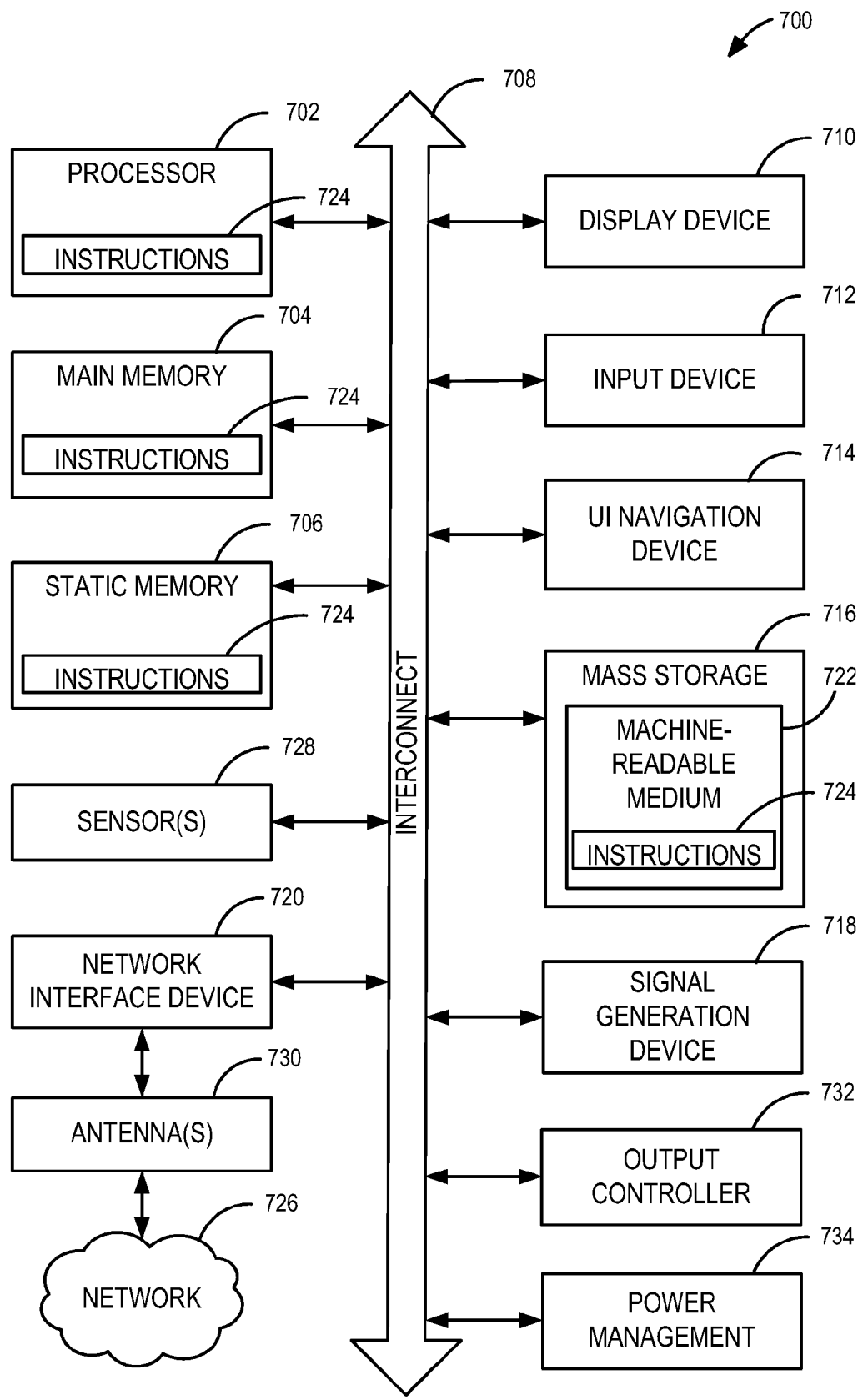
FIG. 7 illustrates an example computer system that may be used as a computing platform for the computing devices described herein.

FIG. 7 is a block diagram illustrating an example computer system machine upon which any one or more of the methodologies herein discussed may be run. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704 and a static memory 706, which communicate with each other via an interconnect 708 (e.g., a link, a bus, etc.). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are a touch screen display. The computer system 700 may additionally include a storage device 716 (e.g., a drive unit), a signal generation device 718 (e.g., a speaker), an output controller 732, a power management controller 734, and a network interface device 720 (which may include or operably communicate with one or more antennas 730, transceivers, or other wireless communications hardware), and one or more sensors 728, such as a global positioning system (GPS) sensor, compass, location sensor, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area internet network connection, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom VLSI circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes a base station (for example, implemented by one or more systems, apparatuses, manufactures, or devices) comprising processing circuitry to implement energy saving management in a primary wireless network, the processing circuitry arranged to: attempt offloading of one or more devices attached to a primary wireless network cell provided by the base station, the offloading being provided from the primary wireless network to a secondary wireless network, wherein the secondary wireless network is provided using a different Radio Access Technology (RAT) than the primary wireless network; determine a maximum service impact for any devices unsuccessfully offloaded to the secondary wireless network; and implement energy saving management at the primary wireless network cell in response to not exceeding the maximum service impact.

In Example 2, the subject matter of Example 1 may optionally include the base station being an enhanced Node B (eNodeB) and wherein the eNodeB provides the primary wireless network according to a 3GPP Long Term Evolution (LTE) or Long Term Evolution-Advanced (LTE-A) standard.

In Example 3, the subject matter of one or any combination of Examples 1-2 may optionally include the secondary wireless network being a Wi-Fi network operating independent of the base station, and wherein the Wi-Fi network is provided according to a standard from the IEEE 802.11 standards family.

In Example 4, the subject matter of one or any combination of Examples 1-3 may optionally include implementing or delaying the energy saving management at the primary wireless network cell based on devices attached to the primary wireless network cell in an idle mode.

In Example 5, the subject matter of one or any combination of Examples 1-4 may optionally include factoring idle mode of the devices attached to the primary wireless network cell by performing centralized idle mode energy saving management techniques at the base station including: determining Idle state Signaling Reduction (ISR) states of the devices attached to the primary wireless network cell from a Mobility Management Entity (MME), the MME supporting idle mode registration of the devices attached to the primary wireless network cell; and proceeding with implementing the energy saving management at the primary wireless network cell if a number of devices having an deactivated ISR state is equal to or less than a determined threshold.

In Example 6, the subject matter of one or any combination of Examples 1-5 may optionally include factoring idle mode of the devices attached to the primary wireless network cell by performing distributed idle mode energy saving management techniques at the base station including: determining a number of the devices attached to the primary wireless network cell having a deactivated Idle state Signaling Reduction (ISR) state, based on Operations Administration and Management (OAM) and Mobility Management Entity (MME) operations to determine devices associated with the primary wireless network cell and ISR activation states of the devices; and proceeding with implementing the energy saving management at the primary wireless network cell if the number of devices having a deactivated ISR state is less than a determined threshold.

In Example 7, the subject matter of one or any combination of Examples 1-6 may optionally include determining whether the devices attached to the primary wireless network cell are in a connected mode, and implement or delay the energy saving management at the primary wireless network cell based on a number of the devices attached to the primary wireless network cell determined to be in a connected mode.

In Example 8, the subject matter of one or any combination of Examples 1-7 may optionally include the secondary wireless network is configured for providing a speed, quality, and level of service equal or greater than the primary wireless network.

In Example 9, the subject matter of one or any combination of Examples 1-8 may optionally include a timing of initiating the energy saving management being determined using one or more statistics-based network conditions.

In Example 10, the subject matter of one or any combination of Examples 1-9 may optionally include a timing of initiating the energy saving management being determined using one or more activation schedules.

In Example 11, the subject matter of one or any combination of Examples 1-10 may optionally include the primary wireless network being a UMTS network, wherein the offloading of the one or more devices includes a request to roam the one or more devices to a GSM cell, and wherein the implementing energy saving management at the primary wireless network cell includes factoring a number of devices unable to be roamed to the GSM cell.

Example 12 may include, or may optionally be combined with the subject matter of one or any combination of Examples 1-11 to include a method (e.g., a process, technique, or procedural implementation) for implementing energy saving management for network equipment of a primary network, comprising: attempting to offload, from a primary wireless network to a secondary wireless network, one or more devices connected to the primary wireless network, wherein communications in the secondary wireless network are conducted according to a different network type than the primary wireless network; determining results of offloading the one or more devices to the secondary wireless network, the results including a number of devices unsuccessfully offloaded to the secondary wireless network; and activating energy saving management at the primary wireless network in response to the number of devices unsuccessfully offloaded to the secondary wireless network not exceeding a maximum number of devices.

In Example 13, the subject matter of Example 12 may optionally include the network equipment of the primary network being provided by an enhanced Node B (eNodeB) and wherein the eNodeB operates according to a Long Term Evolution (LTE) or Long Term Evolution-Advanced (LTE-A) standard.

In Example 14, the subject matter of one or any combination of Examples 12-13 may optionally include the secondary network being a Wi-Fi network operating independent of the primary wireless network, and wherein the Wi-Fi network operates according to a standard from the IEEE 802.11 standards family.

In Example 15, the subject matter of one or any combination of Examples 12-14 may optionally include implementing energy saving management at the primary wireless network including factoring idle mode of the devices attached to the primary wireless network, by: determining whether any device attached to the primary wireless network has a deactivated Idle state Signaling Reduction (ISR) state, based on Operations Administration and Management (OAM) and Mobility Management Entity (MME) operations to retrieve devices associated with the primary wireless network and ISR activation states of the devices; and activating the energy saving management at the primary wireless network if the number of devices having a deactivated ISR state is less than a determined threshold.

In Example 16, the subject matter of one or any combination of Examples 12-15 may optionally include requesting the ISR activation states of each device from the MME to determine the ISR state.

In Example 17, the subject matter of one or any combination of Examples 12-16 may optionally include determining whether any device has a deactivated ISR state is performed at the OAM, and wherein an enhanced NodeB (eNodeB) providing the primary wireless network is used to provide an energy saving management activation status to the OAM.

Example 18 may include, or may optionally be combined with the subject matter of one or any combination of Examples 1-17 to include a system (e.g., a configuration or arrangement of one or more manufactures, apparatuses, devices, or subsystems) comprising: one or more network equipment; one or more Operations Administration and Management (OAM) subsystems configured to activate energy saving management of the one or more network equipment, by causing the one or more network equipment to provide a request to initiate multi-Radio Access Technology (multi-RAT) network offloading of one or more user equipment attached to a network provided by the one or more network equipment; and processing circuitry arranged to determine results of initiating the multi-RAT network offloading and proceed with the energy saving management of the one or more network equipment in response to a determined number of the one or more user equipment being successfully offloaded.

In Example 19, the subject matter of Example 18 may optionally include the one or more network equipment being configured to factor one or more service impact thresholds in determining whether to activate energy saving management.

In Example 20, the subject matter of one or any combination of Examples 18-19 may optionally include the one or more network equipment being configured to determine the number of the one or more user equipment being successfully offloaded, and wherein the one or more OAM subsystems factor the one or more service impact thresholds in determining whether to provide a command to the one or more network equipment to activate the energy saving management.

In Example 21, the subject matter of one or any combination of Examples 18-20 may optionally include a Mobility Management Entity (MME) configured for supporting idle mode registration (ISR) of one or more user equipment; wherein the one or more network equipment is configured to determine and factor the ISR state in connection with determining whether to activate the energy saving management, and wherein the MME is configured to provide ISR states of the one or more user equipment to the one or more network equipment in response to a request.

Example 22 may include, or may optionally be combined with the subject matter of one or any combination of Examples 1-21 to include a system (e.g., a configuration or arrangement of one or more manufactures, apparatuses, devices, or subsystems) comprising: a primary network base station providing a primary wireless network; a secondary network base station providing a secondary wireless network with a radio access technology (RAT) distinct from the primary wireless network; one or more mobile wireless devices capable of multi-RAT communication and attached to the primary wireless network; wherein the primary network base station is configured for implementing energy saving management at the primary wireless network, with operations to: attempt offloading of the mobile wireless devices to the secondary wireless network; determine a number of mobile wireless devices unable to be offloaded to the secondary wireless network; and activate energy saving management at the primary wireless network based on the determination of the number of mobile wireless devices unable to be offloaded to the secondary wireless network.

In Example 23, the subject matter of Example 22 may optionally include the mobile wireless device being a computing device selected from the group consisting of a smartphone, a personal digital assistant (PDA), a notebook computer, a netbook computer, and a tablet, and wherein the mobile wireless device is configured as a dual-mode user equipment to connect with the primary wireless network and the secondary wireless network.

In Example 24, the subject matter of one or any combination of Examples 22-23 may optionally include the primary network base station being configured for factoring idle mode state of the one or more mobile wireless devices in determining whether to activate the energy saving management.

In Example 25, the subject matter of one or any combination of Examples 22-24 may optionally include the operations to activate energy saving management at the primary wireless network being further based on a comparison of the number of mobile wireless devices unable to be offloaded to the secondary wireless network with one or more service level thresholds.

The Abstract of the Disclosure is intended to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A base station, comprising processing circuitry to perform energy saving management in a primary wireless network, the processing circuitry arranged to:
    attempt offloading of one or more devices attached to a primary wireless network cell provided by the base station, the offloading being provided from the primary wireless network to a secondary wireless network, wherein the secondary wireless network is provided with a different Radio Access Technology (RAT) than the primary wireless network;
    determine a maximum service impact for any devices unsuccessfully offloaded to the secondary wireless network that remain attached to the primary wireless network in an idle mode, wherein the maximum service impact defines a maximum number of devices attached to the primary wireless network cell that are in a deactivated Idle state Sing Reduction (ISR) state; and
implement energy saving management at the primary wireless network cell in response to not exceeding the maximum service impact.

2. The base station of claim 1, wherein the base station is an evolved Node B (eNodeB) and wherein the eNodeB provides the primary wireless network according to a 3GPP Long Term Evolution (LTE) or Long Term Evolution-Advanced (LTE-A) standard.

3. The base station of claim 1, wherein the secondary wireless network is a Wi-Fi network operating independent of the base station, and wherein the Wi-Fi network is provided according to a standard from the IEEE 802.11 standards family.

4. The base station of claim 1, the processing circuitry further configured to delay the energy saving management at the primary wireless network cell based on a number of the devices that remain attached to the primary wireless network cell in an idle mode.

5. The base station of claim 1, wherein operations to implement the energy saving management at the primary wireless network cell perform centralized idle mode energy saving management techniques at the base station, to:
determine ISR states of the devices attached to the primary wireless network cell from a Mobility Management Entity (MME), the MME supporting idle mode registration of the devices attached to the primary wireless network cell; and
proceed with implementation of the energy saving management at the primary wireless network cell if a number of devices in a deactivated ISR state is equal to or less than a determined threshold.

6. The base station of claim 1, wherein operations to implement the energy saving management at the primary wireless network cell perform distributed idle mode energy saving management techniques at the base station, to:
determine a number of the devices attached to the primary wireless network cell in a deactivated Idle state Signaling Reduction (ISR) state, based on Operations Administration and Management (OAM) and Mobility Management Entity (MME) operations to determine devices associated with the primary wireless network cell and ISR activation states of the devices; and
proceed with implementation of the energy saving management at the primary wireless network cell if the number of devices in a deactivated ISR state is less than a determined threshold.

7. The base station of claim 1, the processing circuitry further configured to determine whether the devices attached to the primary wireless network cell are in a connected mode, and implement or delay the energy saving management at the primary wireless network cell based on a number of the devices attached to the primary wireless network cell determined to be in a connected mode.

8. The base station of claim 1, wherein the secondary wireless network is configured for operation at a speed, quality, and level of service equal or greater than the primary wireless network.

9. The base station of claim 1, wherein a timing of initiating the energy saving management is determined using one or more statistics-based network conditions.

10. The base station of claim 1, wherein a timing of initiating the energy saving management is determined using one or more activation schedules.

11. The base station of claim 1, wherein the primary wireless network is a UMTS network, wherein the offloading of the one or more devices includes a request to roam the one or more devices to a GSM cell, and wherein the implementation of the energy saving management at the primary wireless network cell is performed based on a number of devices unable to be roamed to the GSM cell.

12. A method for implementing energy saving management for network equipment of a primary wireless network, comprising:
attempting to offload, from a primary wireless network to a secondary wireless network, one or more devices connected to the primary wireless network, wherein communications in the secondary wireless network are conducted according to a different network type than the primary wireless network;
determining results of offloading the one or more devices to the secondary wireless network, the results including a number of devices unsuccessfully offloaded to the secondary wireless network that are in a deactivated Idle state Signaling Reduction (ISR) state; and
activating energy saving management at the primary wireless network in response to the number of devices unsuccessfully offloaded to the secondary wireless network that are in the deactivated ISR state not exceeding a maximum number of devices.

13. The method of claim 12, wherein the network equipment of the primary wireless network is provided by an evolved Node B (eNodeB) and wherein the eNodeB operates according to a Long Term Evolution (LTE) or Long Term Evolution-Advanced (LTE-A) standard.

14. The method of claim 12, wherein the secondary wireless network is a Wi-Fi network operating independent of the primary wireless network, and wherein the Wi-Fi network operates according to a standard from the IEEE 802.11 standards family.

15. The method of claim 12, wherein implementing energy saving management at the primary wireless network includes factoring idle mode of the devices attached to the primary wireless network, by:
determining a number of devices attached to the primary wireless network in the deactivated ISR state, based on Operations Administration and Management (OAM) and Mobility Management Entity (MME) operations to retrieve devices associated with the primary wireless network and ISR activation states of the devices; and
activating the energy saving management at the primary wireless network if the number of devices in the deactivated ISR state is less than a determined threshold.

16. The method of claim 15, further comprising:
requesting the ISR activation states of each device from the MME to determine the number of devices attached to the primary wireless network in the deactivated ISR state.

17. The method of claim 15, wherein determining whether any device is in a deactivated ISR state is performed at the OAM, and wherein an evolved NodeB (eNodeB) providing the primary wireless network is used to provide an energy saving management activation status to the OAM.

18. A system, comprising:
one or more network equipment;
one or more Operations Administration and Management (OAM) subsystems configured to activate energy saving management of the one or more network equipment, by causing the one or more network equipment to provide a request to initiate multi-Radio Access Technology (multi-RAT) network offloading of one or more user equipment attached to a network provided by the one or more network equipment; and processing circuitry arranged to determine results of initiating the multi-RAT network offloading and proceed with the energy saving management of the one or more network equipment in response to a determined number of the one or more user equipment being successfully offloaded; and a Mobility Management Entity (MME) configured to support an Idle state Signaling Reduction (ISR) state of one or more user equipment (UEs);

wherein the one or more network equipment is configured to consider the ISR state of the one or more UEs when determining whether to activate the energy saving management of the one or more network equipment, and wherein the MME is configured to provide ISR states of the one or more UEs to the one or more network equipment in response to a request.

19. The system of claim 18, wherein the one or more network equipment is configured to factor one or more service impact thresholds in determining whether to activate energy saving management.

20. The system of claim 19, wherein the one or more network equipment is configured to determine the number of the one or more user equipment being successfully offloaded, and wherein the one or more OAM subsystems factor the one or more service impact thresholds in determining whether to provide a command to the one or more network equipment to activate the energy saving management.

21. A system, comprising:
a primary network base station providing a primary wireless network;
a secondary network base station providing a secondary wireless network with a radio access technology (RAT) distinct from the primary wireless network; and
one or more mobile wireless devices capable of multi-RAT communication and attached to the primary wireless network;
wherein the primary network base station is configured to initiate an energy saving management protocol at the primary wireless network, based on a number of the mobile wireless devices attached to the primary wireless network in an idle mode, with operations to:
attempt offloading of the mobile wireless devices to the secondary wireless network;
determine a maximum service impact for any of the mobile wireless devices unsuccessfully offloaded to the secondary wireless network that are in an deactivated Idle state Signaling Reduction (ISR) state; and
implement energy saving management in the primary network base station in response to not exceeding the maximum service impact for the mobile wireless devices that are in the deactivated ISR state.

22. The system of claim 21, wherein the mobile wireless devices are one of: a smartphone, a personal digital assistant (PDA), a notebook computer, a netbook computer, or a tablet; and wherein the mobile wireless devices are configured as dual-mode user equipment to connect with the primary wireless network and the secondary wireless network.

23. The system of claim 21, wherein the primary network base station is configured to initiate the energy saving management protocol at the primary wireless network based on a number of the mobile wireless devices attached to the primary wireless network in an idle mode.

24. The system of claim 21, wherein the operations to implement energy saving management in the primary network base station are further based on a comparison of the number of mobile wireless devices unable to be offloaded to the secondary wireless network with one or more service level thresholds.

25. The system of claim 21, wherein operations to implement energy saving management in the primary network base station are performed with centralized idle mode energy saving management techniques at the primary network base station that:
determine ISR states of the mobile wireless devices attached to the primary wireless network from a Mobility Management Entity (MME), the MME supporting idle mode registration of the mobile wireless devices attached to the primary wireless network; and
proceed with implementation of the energy saving management at the primary network base station if a number of the mobile wireless devices in the deactivated ISR state is equal to or less than a determined threshold.

26. The system of claim 21, wherein operations to implement energy saving management in the primary network base station are performed with distributed idle mode energy saving management techniques at the primary network base station including:
determine a number of the mobile wireless devices attached to the primary wireless network in a deactivated Idle state Signaling Reduction (ISR) state, based on Operations Administration and Management (OAM) and Mobility Management Entity (MME) operations to determine the mobile wireless devices associated with the primary wireless network and ISR activation states of the mobile wireless devices; and
proceed with implementation of the energy saving management at the primary wireless network if the number of mobile wireless devices in the deactivated ISR state is equal to or less than a determined threshold.

27. The base station of claim 1, the processing circuitry further configured to initiate the energy saving management at the primary wireless network cell based on a number of the devices attached to the primary wireless network cell in an idle mode.

* * * * *